W. G. MOFFET.
CAN TESTING MACHINE.
APPLICATION FILED JULY 5, 1911.
1,059,381.
Patented Apr. 22, 1913.
5 SHEETS—SHEET 1.
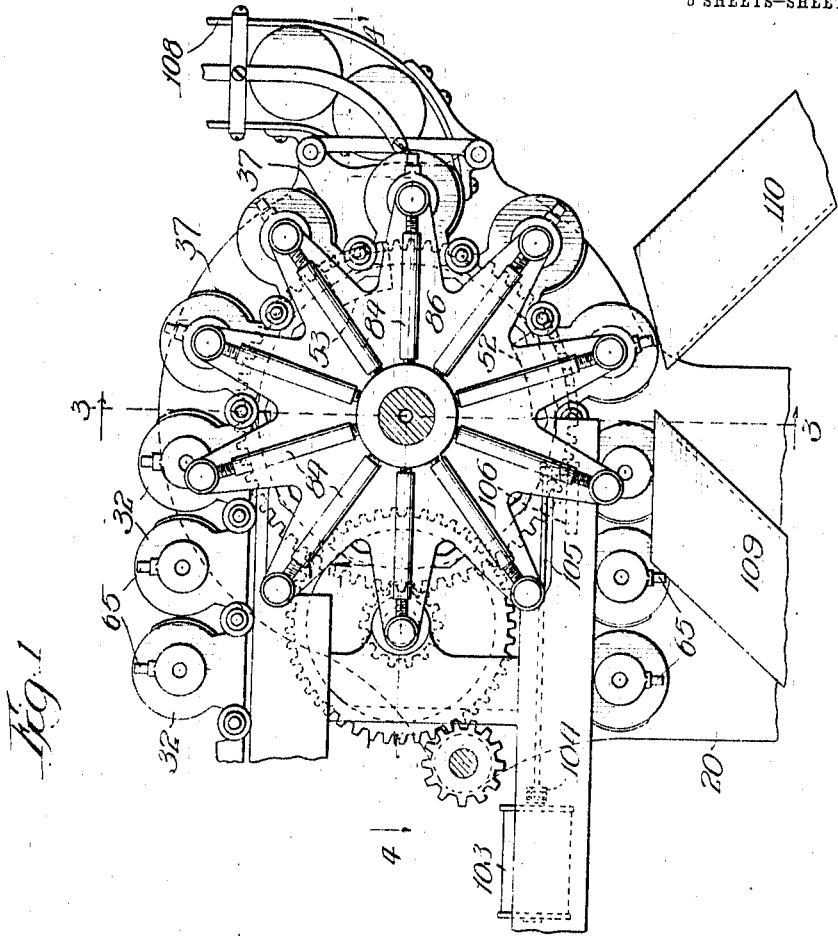
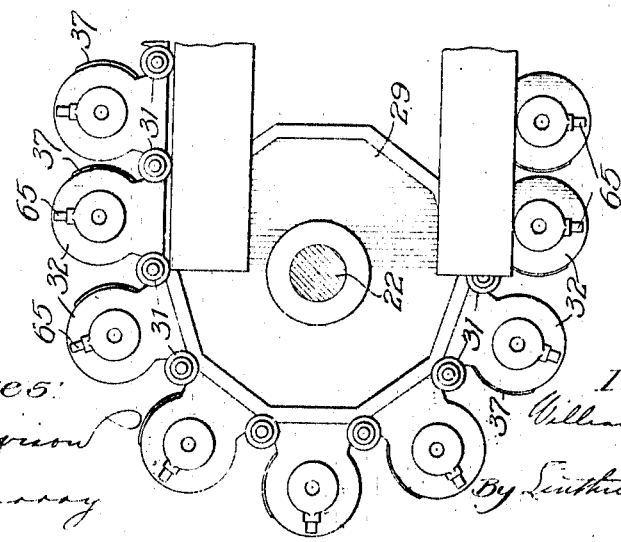

W. G. MOFFET.
CAN TESTING MACHINE.
APPLICATION FILED JULY 5, 1911.
1,059,381.
Patented Apr. 22, 1913.
5 SHEETS—SHEET 2.
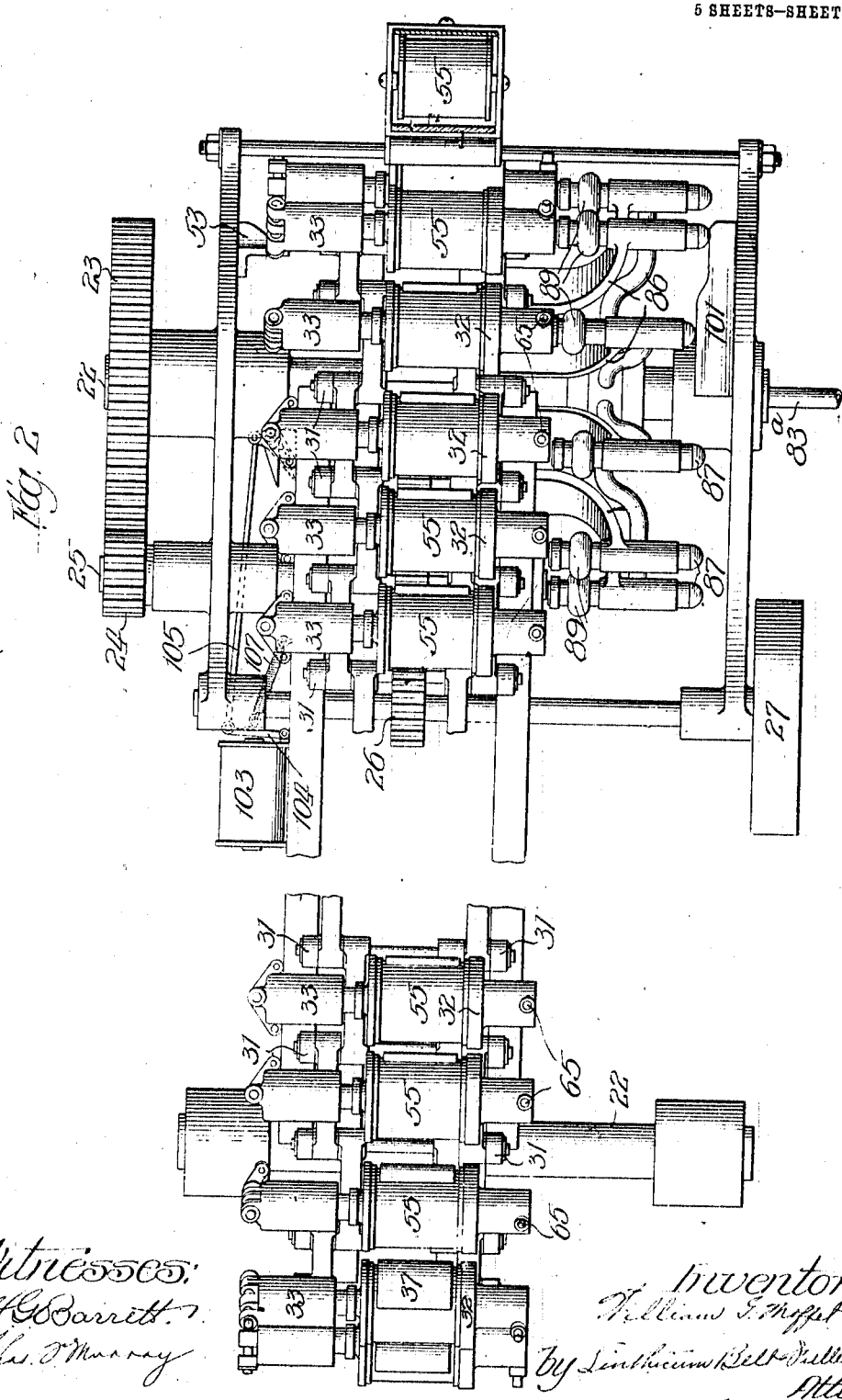

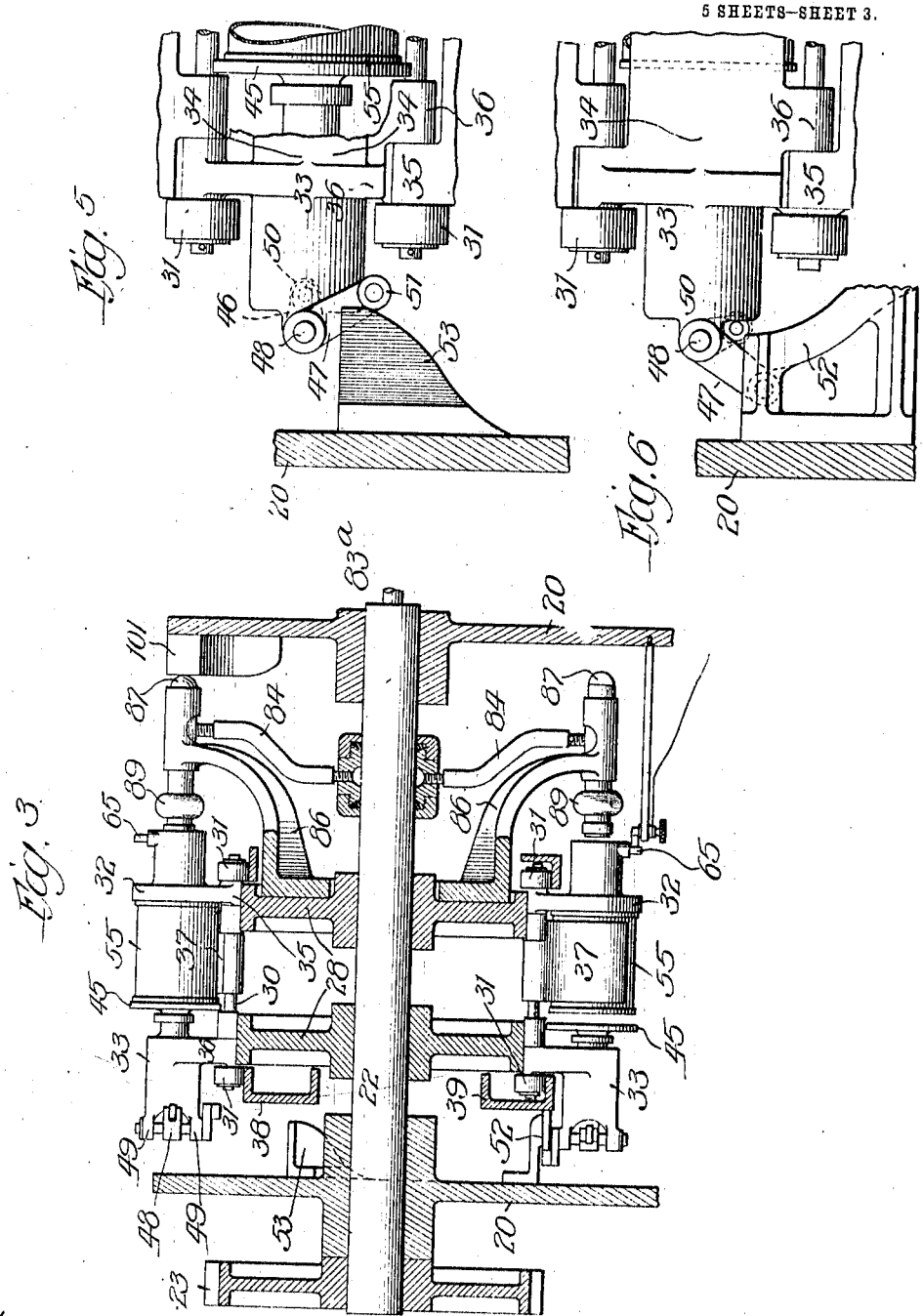

W. G. MOFFET.
CAN TESTING MACHINE.
APPLICATION FILED JULY 5, 1911.
1,059,381.
Patented Apr. 22, 1913.
5 SHEETS—SHEET 4.
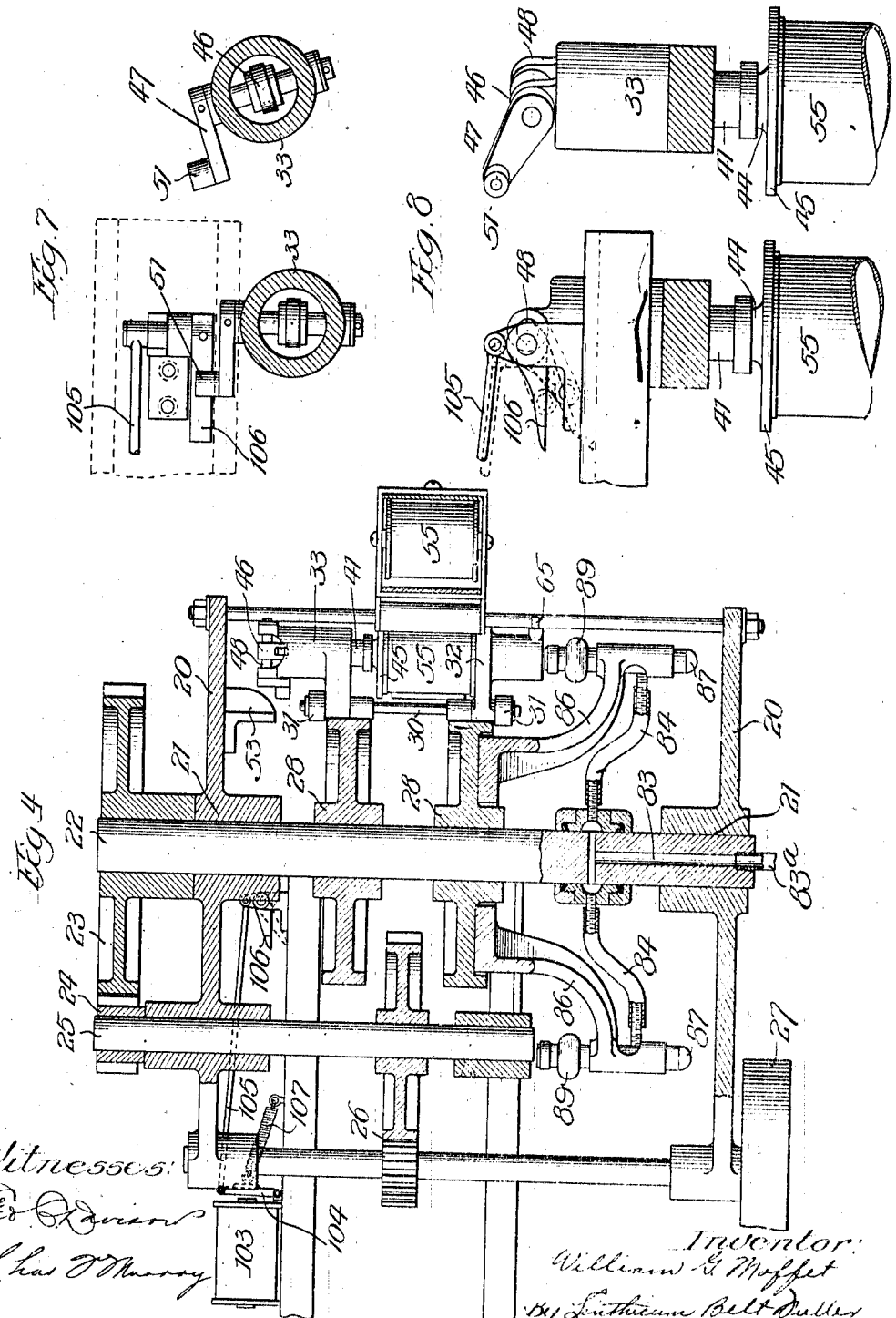

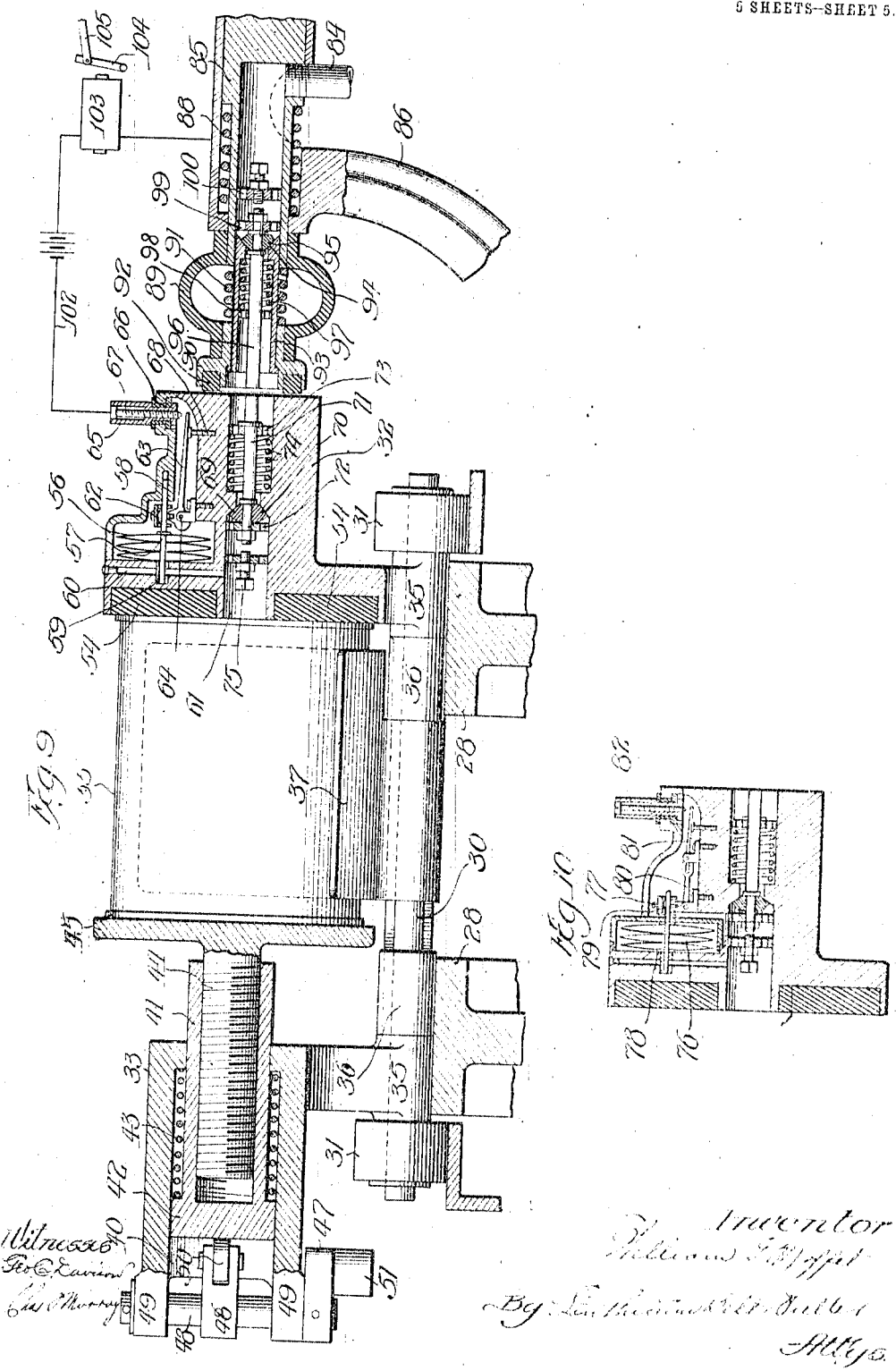

UNITED STATES PATENT OFFICE.

WILLIAM G. MOFFET, OF CHICAGO, ILLINOIS, ASSIGNOR OF ONE-HALF TO JESSE W. NICHOLS, OF CHICAGO, ILLINOIS.

CAN-TESTING MACHINE.

1,059,381. Specification of Letters Patent. Patented Apr. 22, 1913.

Application filed July 5, 1911. Serial No. 637,032.

*To all whom it may concern:*

Be it known that I, WILLIAM G. MOFFET, a citizen of the United States, residing at Chicago, in the county of Cook and State of Illinois, have invented certain new and useful Improvements in Can-Testing Machines, of which the following is a specification.

My invention relates to can machinery and has particular reference to a machine for testing cans in order to detect any leakage therein. A similar apparatus is disclosed in my co-pending application filed of even date herewith, entitled Machine for Testing Cans.

The present machine has many advantages which will be apparent to those skilled in the art. 1st, it is compact and its parts are readily accessible; 2nd, it may be made of very large capacity by merely extending its length, whereas in circular conveyers the size is more limited; 3rd, the means for the admission of the testing fluid are so arranged that there is no possibility of leakage between the source of fluid pressure and the testing unit; 4th, the connecting means between the testing unit and the air admission terminal whereby the valves are not opened until the connection is sealed; 5th, the combination with a machine such as described of a novel detector mechanism; 6th, the arrangement of the parts in such manner that no ejector mechanism is necessary for the cans.

With these objects in view my invention consists, broadly stated, in a plurality of can testing units suitably linked together to form an endless chain, means for causing travel of said chain testing units, and means for supplying fluid pressure to cans held by said testing units and detector mechanism so arranged that the imperfect cans are detected and discharged in a separate chute.

My invention will be more readily understood by reference to the accompanying drawings wherein, Figure 1 is a side elevation of a machine such as heretofore described, the central portion being broken away; Fig. 2 is a plan view of the machine shown in Fig. 1; Fig. 3 is a section on the line 3—3 of Fig. 1; Fig. 4 is a section on the irregular line 4—4 of Fig. 1; Fig. 5 is a fragmentary detail showing the arrangement of parts for clamping the cans; Fig. 6 is a similar view showing the arrangement for unclamping; Fig. 7 is an end view of two clamping units; Fig. 8 is a side view of the parts shown in Fig. 7; Fig. 9 is an enlarged sectional detail of the detector mechanism, the double valve and the sealing means as applied to a testing unit, and Fig. 10 is a modification showing a reversal of the parts in the detector mechanism whereby vacuum may be used instead of pressure.

Referring more particularly to the drawings it will be seen that I provide a frame work, a portion of which is shown at 20, on which the moving parts are mounted. In suitable bearings 21, 21 in said frame work I mount transverse shafts 22, 22. Motion is imparted to one of these shafts by means of gear 23, pinion 24, short shaft 25, further gears and pinions 26 and belt wheel 27. Also carried on each shaft 22 are two wheels 28, 29, these wheels being preferably polygonal in outline, the wheels in the present instance being ten sided. On these wheels 28, 29, is carried a chain, each chain being made up of a plurality of testing units composed of a short shaft 30, having anti-friction rollers 31 on the exteriors thereof. Carried by the shaft are heads 32, 33, preferably connected by the portion 34, having perforated lugs 35, 36, through which the shaft passes. These lugs 35, 36, are staggered on opposite sides in order to securely interlock the conveyer chain. The part 34 has secured thereto an upstanding segment 37, which provides the can-receiving cradle. This is shown in Fig. 1.

In order to suitably guide the conveyer units and prevent sagging I provide ways 38, 39 with which the rollers 31 coöperate. These ways or guides may be, as shown in Fig. 3, in the form of angles, channels or flat plates. It will be seen that the heads 32, 33, are rigid with relation to each other. Within the recess 40, in the head 33, I mount an interiorly threaded piston 41, having a head 42. A helical spring 43 is mounted within the recess 40, and contacts the head 42 of the piston. Within the threaded recess in the piston 41 I mount the shank 44 of a clamping head 45. This shank 44 is threaded and by this means cans of different lengths may be accommodated between the clamping heads by the adjustment of the head 45. The piston 41, carrying the clamping head 45, is adapted to be reciprocated against the force of the spring 43, by means of the levers 46, 47 rigid with a short shaft 48, mounted in bearings 49, carried by the head 33. Anti-friction rollers 50, 51, are provided at the terminals of the levers 46, 47. Cams 52, 53, mounted on the frame work of the machine provide respectively for shifting the clamping head 45 into opened or closed position. In the head 32 is mounted a packing ring 54, against which the open end of a can 55 is adapted to be thrust. Within the head 32 is provided my novel detector mechanism which includes diaphragms 56, secured at 57 to a shaft 58, having a port 59 therein. The port 59 communicates with a passage 60 in the head 32 and this passage communicates with an opening 61 concentric with the heads and with a can clamped therebetween. Also carried by the shaft 58 and slidably held thereon is a member 62, which is in turn connected to a contact piece 63, pivoted at 64 to a portion of the head 32. An electrical terminal 65, suitably insulated at 66, is also provided. This terminal 65 has a screw-threaded contact piece 67, by means of which the extent of movement of the contact piece 63 may be regulated. An adjustable stop pin 68 limits the movement of the contact piece in the other direction. It will be noted that the part 62 is pivoted to the short arm of the contact piece 63 and that the stem 58 passes through the part 62 and is frictionally engaged by reason of a small leaf spring. Thus the stem may have extended movement through the part 62, but at each change in direction of movement of the stem the contact piece is actuated. The advantage in having the part 62 connected loosely to the shaft 58 is in that the contact piece will be operated at the slightest leak in the can, irrespective of the pressure of the testing fluid.

In all the testing machines within my knowledge the pressure of the testing fluid must be kept absolutely constant; otherwise if the pressure is above normal the ejecting mechanism will not operate in case a small leak is discovered. In my construction, as will be seen, the diaphragms may expand to their full limit, the shaft merely sliding within the part 62; however, at the slightest loss of compressed fluid the diaphragms will contract carrying the part 62 and rocking the contact piece. It will be noted that I have provided a plurality of diaphragms 56, their interiors being in communication. A portion of one diaphragm is secured to a rigid part of the machine, the point of attachment preferably surrounding an opening through which the fluid may enter; also seated in the opening is a longitudinally movable shaft 58, to one portion of which a wall of a diaphragm farthest removed from the first mentioned diaphragm is secured. I have found this construction to be much preferable over that of a single diaphragm in that it is more sensitive to slight changes in the pressure and still has a large capacity.

Within the recess 61 in the head 32 I provide a valve seat 69, against which a valve 70 is adapted to seat. This valve is carried by a valve stem 71, carried by suitable guides 72, 73, and normally held in closed position by means of an expansion spring 74. A stop 75 is provided by means of which the limit of movement of the valve may be determined. It will be seen that the valve stem 71 extends normally flush with the outer face of the head 32.

The construction of Fig. 10 is identical with that of Fig. 9, except that the interiors of the diaphragms 76 are connected to the atmosphere. The diaphragms are surrounded by an air-tight casing and the vacuum connection is to the casing; that is, to the exterior of the diaphragms. The diaphragms are connected to the shaft 77 at 78, there being, as in the first described instance, a sliding connection 79 between the shaft and a rocker 80, the rocker actuating the contact piece 81. If a leak is found in the can, however, air will enter the casing around the diaphragms and allow the diaphragms to contract, thus carrying the contact piece 79 with the shaft and completing the circuit through a terminal 82. In order to provide for the entrance of air or vacuum to the can testing units I provide in the shaft 22, ports 83. A tube 83ª connects the ports 83 with a suitable source of air or vacuum supply. These ports communicate with flexible tubes 84, terminating in the recessed members 85, carried by a spider 86, secured to one of the polygonal wheels 28. The recessed member 85 is in the form of a plunger having a rounded outer end 87, and normally held in expanded position by means of the spring 88. A flexible diaphragm 89 is secured at one end to the plunger 85 and at the other end to a cap 90; a spring 91 within the diaphragm tending to expand the same. A rubber packing 92 is provided in the cap 90, this rubber portion being used to secure a tight joint when the parts are thrust against the head 32. A tubular extension 93 of the cap 90 and a valve seat 94, accommodates a valve 95, carried on a stem 96 and normally held against its seat by an expansion spring 97. This valve stem 96 is guided by portions 98, 99, and a stop 100, carried by the plunger 85, limits the longitudinal movement of the valve and stem. It will be seen that the shifting of the plunger 85, with relation to the spider 86, causes the compression of the spring 88, the contraction of the diaphragm 89 against the force of the spring 91, the seating of the packing 92 against the outer face of the head 33, the contact of the valve stems 71 and 96 and the unseating of the valves 70 and 95, thus admitting air through the conduit 84, to the interior of a can. The shifting of the plunger 85 is caused by contact with a cam 101, carried by the frame work of the machine.

The operation of the parts in order to expel an imperfect can may be described as follows: An electrical circuit 102, having a source of electrical energy, includes a magnet 103, having an armature 104, connected by a link 105, connected to a shiftable cam 106, all the parts being mounted on the frame work of the machine. The armature 104 is normally held away from the core of the magnet by the contractile spring 107. An untested can chute 108 provides for the entrance of the cans and the chutes 109, 110 provide for the discharge of imperfect and perfect cans respectively.

The operation of my machine is as follows: Assuming the can testing units to be empty, power is applied to start the device in operation and cans are supplied through the chute 108. The clamping heads 45 are retracted at points in the conveyer opposite the mouth of the chute 108 and a can is received in the cradle 34. Immediately thereafter the arm 47 contacts the cam 53, shown in Fig. 5, and clamps the head 45, thrusting the can against the packing 54. It will be seen that during this clamping action the arm 46 is thrown past the center and the parts are securely locked. Immediately thereafter the rounded end 87 of a plunger 85, contacts the cam 101 and causes the admission of air or vacuum to the interior of the can as described in connection with the description of the mechanism. The air remains on the can for only a short time, as will be seen, due to the length of the cam 101, the plunger then being retracted and the air securely trapped within the can by means of the valve 70. The diaphragms 56 are thus expanded and the contact piece 63 resting against the stop 68. The testing unit continues its travel and if during the time consumed in passing from this point to the point opposite the chute 109, any leak is found, air escapes from the can, the diaphragms 56 will be deflated and the contact piece 63 shifted, thus causing the closing of the circuit and the actuation of the armature 104, with the consequent shifting of the cam 106. When thus shifted, the cam will project underneath the roller 50 of the short arm 47, thus causing the rotation of the shaft 48 and the movement of the piston 42, carrying the head 45 therewith. This, due to the position of the can with relation to the cradle 37, permits the can to fall into the imperfect can chute 109. If, however, no leak is discovered in the can, the electrical apparatus will not be actuated and the can testing unit will travel to the point opposite the perfect can chute 110. At this point the roller 50 will contact the fixed cam 52 and cause the release of the can.

While I have described the operation with relation to one can testing unit and one can it will be understood that the operation thus described is continuous, new cans being supplied to the machine through the chute 108. It will be seen also that by my novel arrangement a much higher speed may be attained with the same length of time elapsing between the confining of the air in the can and the discharge of the can than if a conveyer of limited capacity were used. With the present construction there is no limit within reason to the length of the machine and its consequent capacity. Furthermore, it will be seen that the number of parts is reduced to a minimum. By means of the valve arrangement, best shown in Fig. 9, air is not admitted until a perfect seal has been made and the air supply is discontinued before the seal is broken.

It will be understood that many modifications may be made in the mechanism herein shown, all without departing from the spirit of my invention.

I claim:

1. In a device of the class described, the combination of a diaphragm, a stem adapted to be actuated by said diaphragm, an electrical contact piece adapted to be operated by said stem, and a frictional sliding connection between said stem and said contact piece, substantially as described.

2. In a device of the class described, the combination of a fluid actuated diaphragm, a stem longitudinally movable by said diaphragm, an electrical contact piece motion-limiting stops for said contact piece and a frictional connection between said contact piece and said stem whereby the longitudinal movement of said stem is not limited by the movement of said contact piece, substantially as described.

3. In a can testing machine, the combination of a plurality of traveling units, a rotatable member having a plurality of traveling air-pressure terminals, a terminal registering with a unit during a portion of the travel of both thereof, valves in said unit and terminal, and a diaphragm forming a part of the connection between the unit and terminal whereby loss of fluid is avoided, substantially as described.

4. A can testing machine comprising, in combination, a plurality of connected can testing units, detector mechanism associated with each unit, clamping mechanism carried by each unit, a fixed cam arranged to unclamp perfect cans and a shiftable cam arranged for actuation by said detector mechanism and adapted to unclamp imperfect cans, a source of fluid pressure, a plurality of shiftable fluid pressure terminals, one of said terminals registering with a can testing unit and moving in the same path during a portion of its travel, means connecting said terminals with said source of fluid pressure and a cam arranged to shift one of said terminals, whereby fluid pressure is admitted to the interior of a can held by said unit, substantially as described.

WILLIAM G. MOFFET.

Witnesses:
JESSE W. NICHOLS,
ABRAM B. STRATTON.